(12) United States Patent
Zhao et al.

(10) Patent No.: US 10,325,236 B2
(45) Date of Patent: Jun. 18, 2019

(54) SEMICONDUCTOR BULLET LOT DISPATCH SYSTEMS AND METHODS

(71) Applicant: Semiconductor Manufacturing International (Shanghai) Corporation, Shanghai (CN)

(72) Inventors: Anthony Zhao, Shanghai (CN); Allen Wu, Shanghai (CN); Teresa Yu, Shanghai (CN); Xiaobing Tan, Shanghai (CN)

(73) Assignee: SEMICONDUCTOR MANUFACTURING INTERNATIONAL (SHANGHAI) CORPORATION, Shanghai (CN)

( * ) Notice: Subject to any disclaimer, the term of this patent is extended or adjusted under 35 U.S.C. 154(b) by 592 days.

(21) Appl. No.: 14/079,167

(22) Filed: Nov. 13, 2013

(65) Prior Publication Data

US 2014/0365265 A1  Dec. 11, 2014

(30) Foreign Application Priority Data

Jun. 5, 2013 (CN) .......................... 2013 1 0222155

(51) Int. Cl.
*G06Q 10/00* (2012.01)
*G06Q 10/06* (2012.01)

(52) U.S. Cl.
CPC ......... *G06Q 10/06316* (2013.01); *Y04S 10/54* (2013.01)

(58) Field of Classification Search
None
See application file for complete search history.

(56) References Cited

U.S. PATENT DOCUMENTS

| 4,888,692 | A | * | 12/1989 | Gupta | .............. | G05B 19/41865 700/96 |
| 5,164,905 | A | * | 11/1992 | Iwasaki | ................ | G06Q 10/087 414/935 |
| 5,260,868 | A | * | 11/1993 | Gupta | .............. | G05B 19/41865 700/100 |

(Continued)

OTHER PUBLICATIONS

Sami Franssila, Introduction to Microfabrication, Jan. 28, 2005, John Wiley & Sons, p. 357.*

(Continued)

*Primary Examiner* — Hafiz A Kassim
(74) *Attorney, Agent, or Firm* — Anova Law Group, PLLC

(57) ABSTRACT

A semiconductor bullet lot dispatch system is provided. The semiconductor bullet lot dispatch system includes a plurality of lots having bullet lots and non-bullet lots, and a processing site having a plurality of load ports used to run the lots. The semiconductor bullet lot dispatch system also includes a bullet lot arriving time initial module configured to collect work flow information of the lots and calculate bullet lot arriving time intervals; and a port remaining time initial module configured to calculate port next available time intervals. Further, the semiconductor bullet lot dispatch system includes a future constraint check module configured to match the bullet lots with the load ports, and a bullet lot scenario engine module configured to calculate a total available lot count of each of available load ports and dispatch the bullet lots to the load ports.

18 Claims, 5 Drawing Sheets

(56) References Cited

U.S. PATENT DOCUMENTS

| | | | | |
|---|---|---|---|---|
| 6,434,440 B1* | 8/2002 | Teranishi | G06Q 10/06 | 700/1 |
| 6,959,225 B1* | 10/2005 | Logsdon | G05B 19/41865 | 700/100 |
| 7,236,843 B1* | 6/2007 | Wizelman | G05B 19/41865 | 700/100 |
| 7,460,920 B1* | 12/2008 | Qu | G05B 19/41885 | 700/100 |
| 7,623,936 B1* | 11/2009 | Qu | G05B 19/41865 | 700/101 |
| 8,712,569 B2* | 4/2014 | Goh | G06Q 10/0633 | 438/14 |
| 2004/0029300 A1* | 2/2004 | Iijima | H01L 21/67276 | 438/14 |
| 2004/0039469 A1* | 2/2004 | Lin | G05B 19/4189 | 700/100 |
| 2004/0087187 A1* | 5/2004 | Oh | G05B 19/41865 | 438/800 |
| 2004/0138940 A1* | 7/2004 | Aybar | G06Q 10/06 | 705/7.13 |
| 2004/0243268 A1* | 12/2004 | Hsieh | H01L 21/67276 | 700/108 |
| 2005/0113955 A1* | 5/2005 | Chien | G06Q 10/06 | 700/101 |
| 2005/0149217 A1* | 7/2005 | Okada | G06Q 10/06 | 700/96 |
| 2007/0156272 A1* | 7/2007 | Winstead | G05B 15/02 | 700/97 |
| 2007/0168318 A1* | 7/2007 | Burda | G03F 7/70741 | |
| 2008/0140246 A1* | 6/2008 | Kang | G05B 19/41815 | 700/109 |
| 2008/0167743 A1* | 7/2008 | Volant | G06Q 10/06 | 700/99 |
| 2008/0183324 A1* | 7/2008 | Krisnamuthi | G06Q 10/06 | 700/112 |
| 2008/0195241 A1* | 8/2008 | Lin | G05B 19/41865 | 700/101 |
| 2008/0275582 A1* | 11/2008 | Nettles | G05B 19/41865 | 700/100 |
| 2009/0005896 A1* | 1/2009 | Gifford | G05B 19/41865 | 700/121 |
| 2009/0088895 A1* | 4/2009 | Schmidt | G05B 19/41865 | 700/228 |
| 2009/0149979 A1* | 6/2009 | McGahay | G06Q 10/06 | 700/101 |
| 2010/0228376 A1* | 9/2010 | Stafford | G06Q 10/04 | 700/110 |
| 2012/0109351 A1* | 5/2012 | Yamartino | H01L 21/67276 | 700/101 |

OTHER PUBLICATIONS

Lawrence M. Wein et al. (Scheduling Semiconductor Wafer Fabrication, IEEE Transactions on Semiconductor Manufacturing, vol. I, No. 3, Aug. 1988). (Year: 1988).*

* cited by examiner

SEMICONDUCTOR BULLET LOT DISPATCH SYSTEMS AND METHODS

CROSS-REFERENCES TO RELATED APPLICATIONS

This application claims the priority of Chinese patent application No. 201310222155.5, filed on Jun. 5, 2013, the entirety of which is incorporated herein by reference.

FIELD OF THE INVENTION

The present invention generally relates to the field of semiconductor manufacturing technology and, more particularly, relates to semiconductor bullet lot dispatch systems and methods.

BACKGROUND

The manufacturing of integrated circuits (ICs) requires a number of discrete process steps to create packaged, semiconductor devices from a wafer. Under an normal circumstance, the wafer would go through all necessary steps step-by-step by following a preset process flow. That is, contents of each step, process parameters, and time sequences of the process flow would be preset, and the wafer would sequentially go through each of the steps.

A manufacturing of bullet lots may be a common phenomena in the IC manufacturing. One type of the bullet lots may be new type out (NTO) lots. That is, a smaller number of devices may be fabricated before customers use a FAB (semiconductor fabrication plant) for a mass production. Whether or not to order a large quantity of devices will be determined by the quality and turn out time of the bullet lots. Thus, NTO lots may bring the FAB a large number of subsequent orders, and may significantly improve the manufacturing capacity and performance of the FAB.

Further, abnormal lots may be found from a certain process step of a normal fabrication process. When the abnormal issue is found and solved, bullet lots may be urgently needed to test the feasibility of the solutions. If the solutions work well, they may be spread all over the FAB, thus the manufacturing of the bullet lots may contribute to the yield and productivity of the FAB.

Further, a new technology may be invented by engineers; the new technology may improve the manufacturing level of the FAB; and more customer orders may be attracted to the FAB. Thus, bullet lots of the new technology may need to be dispatched as soon as possible. Therefore, the bullet lot dispatch may significantly affect the yield, manufacturing capacity, and the process level of the FAB, it may need to be handled with a priority.

However, sources of the FAB have their limitation, how to reasonably allocate the sources to bullet lots without disturbing a normal manufacturing process may be a complex question. FIG. 1 illustrates a work flow of an existing bullet lot dispatch method.

As shown in FIG. 1, at the beginning of the bullet lot dispatch process, an online personnel may check if there are bullet lots in a load port need to be run (S101). If there are bullet lots need to be run, it may start to run the bullet lots (S102). If there is no bullet lot to be run, it may check if there are incoming bullet lots (S103). If there are incoming bullet lots, a standby load port may wait for the incoming bullet lots (S104). If there is no incoming bullet lot, the standby load port may run other lots (S105).

However, such bullet lot management and dispatch method may be cursory; and may be unable to match the requirements to optimize the manufacturing capacity of a FAB. The disclosed methods and systems overcome such problems set forth above and other problems by using a real time dispatch (RTD) system.

BRIEF SUMMARY OF THE DISCLOSURE

One aspect of the present disclosure includes a semiconductor bullet lot dispatch system. The semiconductor bullet lot dispatch system includes a plurality of lots having bullet lots and non-bullet lots, and a processing site having a plurality of load ports configured to run the lots. The semiconductor bullet lot dispatch system also includes a bullet lot arriving time initial module configured to collect work flow information of the lots and calculate bullet lot arriving time intervals; and a port remaining time initial module configured to calculate port next available time intervals. Further, the semiconductor bullet lot dispatch system includes a future constraint check module configured to match the bullet lots with the load ports, and a bullet lot scenario engine module configured to calculate a total available lot count of each of available load ports and dispatch the bullet lots to the load ports.

Another aspect of the present disclosure includes a semiconductor bullet lot dispatch method. The semiconductor bullet lot dispatch method includes proving a plurality of lots including bullet lots and non-bullet lots; and providing a processing site having a plurality of load ports. The semiconductor bullet lot dispatch method also includes collecting work flow information of the lots and calculating the bullet lot arriving time intervals of the bullet lots; and calculating port next available time intervals according to running information of the load ports. Further, the semiconductor bullet lot dispatch method includes matching the bullet lots with the load ports according the work flow information and obtaining available load ports when the bullet lots arrive at the processing site; and calculating a total available lot count according the bullet lot arriving time intervals and the port next available intervals and dispatching the bullet lots to the load ports according to the total available lot count.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
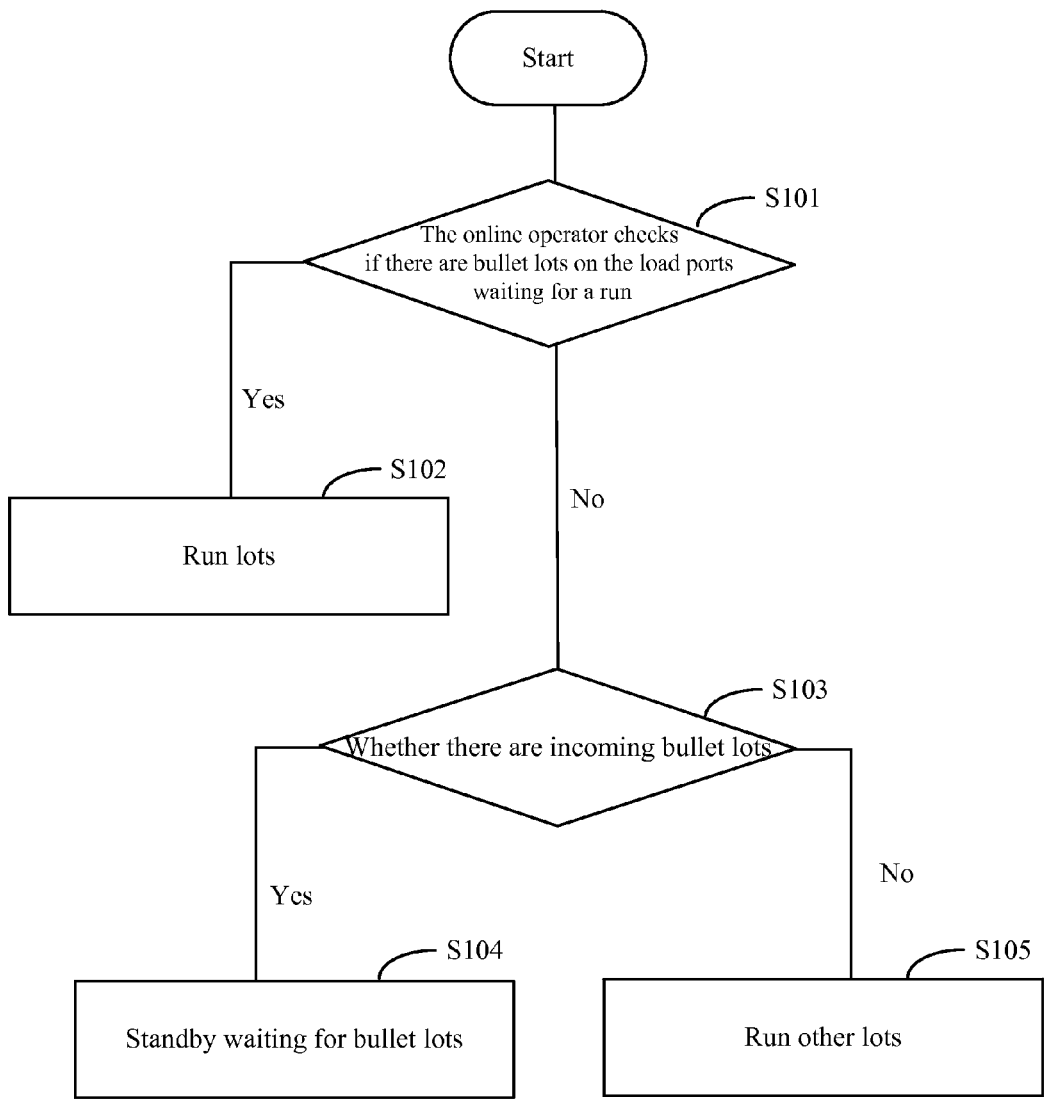
FIG. 1 illustrate a work flow of an existing bullet lot dispatch method.

A bullet lot report may be used in the existing bullet lot dispatch method. In the bullet lot report, a manufacturing cycle time may be a trackable processing time of the bullet lots plus a five minute long queue time. Further, time intervals of the bullet lots may be arranged sequentially in the bullet lot report. Then, the bullet lots may be run by following the work flow shown in FIG. 1. Specifically, an online planner may checks if there are bullet lots in the load ports firstly. If there are bullet lots, the bullet lots may be run firstly. If there is no bullet lot, the bullet lot report may be checked to find if there are incoming bullet lots. If there are incoming bullet lots, standby load ports may wait for the incoming bullet lots.

However, such a bullet lot dispatch method may be unable to consider real manufacturing capacities and constraints of a FAB, and the bullet lots may be managed and run by the planner only according to the bullet report. Thus, the dispatch method is rather cursory. Further, the online planer may be unable to reasonably arrange the bullet lots when the planer faces complex manage rules and dispatch sequences.

Figure 2:
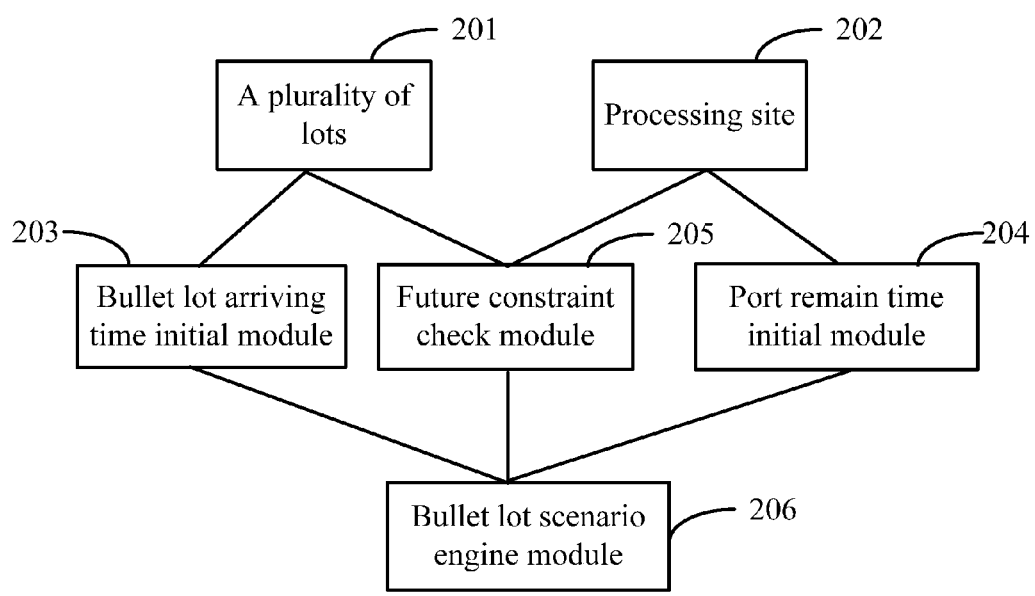
FIG. 2 illustrates a semiconductor bullet lot dispatch system consistent with the disclosed embodiments.

FIG. 2 illustrates a semiconductor bullet lot dispatch system consistent with the disclosed embodiments. As shown in FIG. 2, the semiconductor bullet lot dispatch system may include a plurality of lots 201.

In an IC manufacturing process, there may be some bullet lots, thus the lots 201 may include a plurality of bullet lots and other non-bullet lots. The bullet lots may significantly affect the improvement of yield and capacity of a FAB, thus the bullet lots may need a special dispatch method, and may need to be run with a priority. In one embodiment, the bullet lots may be pre-pilot lots before mass production is ordered in a FAB by customers; the bullet lots may also be certain lots for solving abnormal process problems of a FAB; or certain lots for improving the process level of a FAB.

The dispatch system may also include a set-up and maintenance module (not shown). Engineers may set up and maintain the information of the bullet lots according to the characteristics of the bullet lots using the set-up and maintenance module. The information of the bullet lots may include process steps, and cycle time of the process steps, etc.

Further, as shown in FIG. 2, the semiconductor bullet lot dispatch system may also include a processing site 202. The processing site 202 may include a plurality of load ports. The load ports may be used to run the lots 201.

In one embodiment, the processing site 202 may be one of semiconductor processes including a deposition process, a photolithography process, an etching process, or a measurement process, etc. The processing site 202 may have a plurality of process stations. Each of the stations may have one or more load ports. The load ports may be used to run the lots 201.

Further, as shown in FIG. 2, the semiconductor bullet lot dispatch system may also include a bullet lot arriving time initial module 203. The bullet lot arriving time initial module 203 may be used to collect the process flow information of the bullet lots; and calculate bullet lot arriving time intervals using the process flow information.

A simulation system, such as a move forecast system, may be established in a FAB. The move forecast system may simulate the manufacturing cycle time information of every process step of each of the lots 201 in a single day; and the cycle time information may be saved in a data base. In one embodiment, the bullet lot arriving time initial module 203 may collect work follow information of the lots 201, and the bullet lot arriving time intervals may be obtained by the work follow information. That is, the bullet lot arriving time intervals may be obtained by calculating the cycle time information of each of the process steps of the bullet lots using the move forecast system.

Table 1 illustrates the bullet lot arriving time intervals obtained by the bullet lot arrival time initial module 203. The unit of the bullet lot arriving time intervals of LOT1~LOT8 shown in FIG. 1 may be minute.

TABLE 1

| Bullet Lot | Bullet lot arriving time interval |
|---|---|
| LOT1 | 0 |
| LOT2 | 0 |
| LOT3 | 20 |
| LOT4 | 20 |
| LOT5 | 30 |
| LOT6 | 35 |
| LOT7 | 40 |
| LOT8 | 45 |

For example, as shown in Table 1, the bullet lot LOT1 has arrived the process site, the bullet lot arriving time interval may be zero. The bullet lot arriving time interval of the bullet lot LOT3 may be 30 minutes, and so on and so forth. In certain other embodiments, the lots 201 may have other numbers of bullet lots; and the bullet lot arriving time intervals may use other kinds of units.

Further, as shown in FIG. 2, the semiconductor bullet lot dispatch system may also include a port remaining time initial module 204. The port remaining time initial module 204 may be used to calculate port next available time intervals of each of the load ports according to running information of the load ports.

A process for the port remaining time initial module 204 to obtain the next available time of each of the load ports may include obtaining information of the currently run lots 201 according to the real time process information of each of the load ports. The lots 201 may include bullet lots and other non-bullet lots. Then the next available time intervals may be obtained by processing the work flow information in the move forecast system and the real time information of the currently run lots.

Table 2 illustrates the port next available time intervals of each of the load ports of stations obtained by the port remaining time initial module 204. As shown in Table 2, the process site 202 may include a station A and a station B. The station A may include load ports A1, A2, A3, and A4; the station B may include load ports B1, B2, B3, and B4. Table 2 illustrates the port next available time intervals corresponding to each of the load ports, a unit of the port next available time intervals may be minute.

TABLE 2

| Station | Load port | Port next available time interval |
|---|---|---|
| Station A | A1 | 20 |
|  | A2 | 40 |
|  | A3 | 25 |
|  | A4 | 0 |
| Station B | B1 | 30 |
|  | B2 | 30 |
|  | B3 | 50 |
|  | B4 | 50 |

For example, as shown in Table 2, the port next available time interval of the load port A1 of the station A may be 20 minutes; the port next available time interval of the load port B1 of the station B may be 30 minutes; and so on and so forth. In certain other embodiments, a number of the stations may be different, for example, may be greater than two. A number of the load ports may also be different.

Further, as shown in FIG. 2, the semiconductor bullet lot dispatch system may also include a future constraint check module 205. The future constraint check module 205 may be used to obtain available load ports when each of the bullet lots arrives at the processing site 202 by matching the bullet lots with load ports of the stations according to the work flow information.

Each station of a certain processing site may be different in the semiconductor manufacturing, such as the performance of the station, or the age of the station, etc, thus not all stations are suitable to run certain bullet lots. Therefore, available load ports may need to be determined when the bullet lots arrive at the process site 202. The available load ports may be determined by considering process requirements of the bullet lots according to the work flow information; and characteristics of the processing site 202 and load ports.

Table 3 illustrates available load ports when the bullet lots arrive at the process station 202 obtained by the future constraint check module 205 after matching the bullet lots with the load ports according to the work flow information.

Referring to Table 3, "Y" may indicate the corresponding load port may be available when the bullet lots arrives at the process site 202; and "N" may indicate the corresponding load port may be unavailable when the bullet lots arrive at the process site 202. For example, as shown in Table 3, when the bullet lot LOT1 arrives at the process site 202, all the load ports of the station A of the process site 202 may be available. The load port B1 and B2 of the station B may also be available. When the bullet lot LOT2 arrives at the process site 202, all the load ports may be available except the load port A1 of the station A and the load port B4 of the station B.

TABLE 3

|      | A1 | A2 | A3 | A4 | B1 | B2 | B3 | B4 |
|------|----|----|----|----|----|----|----|----|
| LOT1 | Y  | Y  | Y  | Y  | Y  | Y  | N  | N  |
| LOT2 | N  | Y  | Y  | Y  | Y  | Y  | Y  | N  |
| LOT3 | Y  | N  | Y  | Y  | N  | Y  | Y  | N  |
| LOT4 | Y  | Y  | N  | Y  | Y  | N  | Y  | N  |
| LOT5 | Y  | Y  | Y  | Y  | Y  | Y  | Y  | N  |
| LOT6 | N  | N  | N  | N  | Y  | Y  | Y  | N  |
| LOT7 | Y  | Y  | Y  | Y  | N  | N  | Y  | N  |
| LOT8 | N  | Y  | Y  | N  | Y  | Y  | N  | N  |

Further, as shown in FIG. 2, the semiconductor bullet lot dispatch system may also include a bullet lot scenario engine module 206 (may be referred as a dispatch module). The bullet lot scenario engine module 206 may be used to calculate a total available lot count (ALC) of each of available stations according to the bullet lot arriving time intervals and the port next available time intervals of the process site 202; and dispatch each of the bullet lots to the load ports according to the total ALC.

A process for the bullet lot scenario engine module 206 to calculate the total ALC of the available stations may include comparing the bullet lot arriving time intervals with the port next available time intervals. When the bullet lot arriving time intervals are smaller, or equal to the port next available time intervals, the total ALC of the available stations may add 1; when the bullet lot arriving time intervals are greater than the port next available time intervals, the total ALC of the available stations may add 0.

Table 4 illustrates the total ALCs of each of available stations obtained by the bullet lot scenario engine module 206.

TABLE 4

|      | A1 | A2 | A3 | A4 | B1 | B2 | B3 |
|------|----|----|----|----|----|----|----|
| Lot1 | 1  | 1  | 1  | 1  | 1  | 1  | N  |
| Lot2 | N  | 1  | 1  | 1  | 1  | 1  | 1  |
| Lot3 | 1  | N  | 1  | 0  | N  | 1  | 1  |
| Lot4 | 1  | 1  | N  | 0  | 1  | N  | 1  |
| Lot5 | 0  | 1  | 0  | 0  | 1  | 1  | 1  |
| Lot6 | N  | 0  | N  | N  | 0  | 0  | 1  |
| Lot7 | 0  | 1  | 0  | 0  | N  | N  | 1  |
| Lot8 | N  | 0  | 0  | N  | 0  | 0  | N  |
| ALC  | 3  | 5  | 3  | 2  | 4  | 4  | 6  |

Referring to Table 4, "1" may indicate that the bullet lot arrival time intervals of a certain bullet lot is smaller or equal to the port next available time of a certain station. For example, as shown in Table 4, for the station A of the processing site 202, the bullet lot arriving time intervals of the bullet lots LOT1, LOT3, and LOT 4 may be smaller than the port next available time intervals of the load port A1; the bullet lot arriving time intervals of the bullet lots LOT5 and LOT7 may be greater than the port next available time intervals of the load port A1.

Further, referring to Table 4, "N" may correspond to the non-available load ports shown in Table 3. The non-available load ports may be determined by the work flow information of the bullet lots and the characteristics of each of the load ports. For example, The load port A1 the station A may be unavailable to the bullet lots LOT2, LOT6 and LOT 8. Further, the load port B4 of the station B may be unavailable to all the bullet lots LOT1~LOT8, although it is not shown in Table 4.

Further, the total ALC of the each column of load ports may be obtained by adding all the numbers in the corresponding column together. For example, as shown in Table 4, the total ALC of the load port A1 of the station A may be 3; the total ALC of the load port A2 of the station A may be 5; and so on and so forth.

Figure 3:
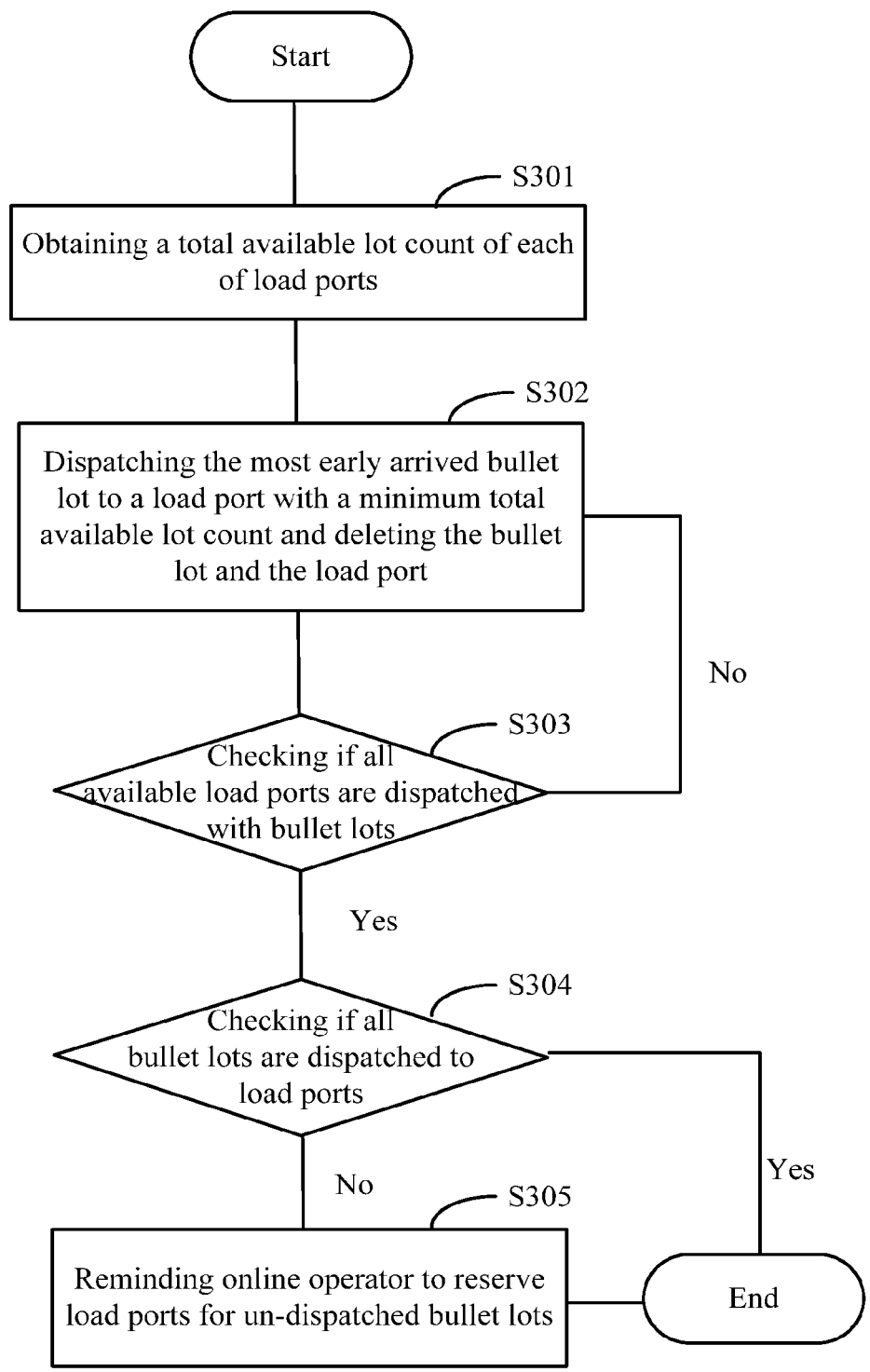
FIG. 3 illustrates a work flow of a bullet lot scenario module dispatching bullet lots to load ports consistent with the disclosed embodiments.

After obtaining the total ALCs of each of the load ports by the bullet lot scenario engine module 206, each of the bullet lots may be dispatched to a load port according the total ALCs. FIG. 3 illustrates a flow chart of dispatching each of the bullet lots to a load port according to the total ALCs.

As shown in FIG. 3, a process for dispatching each of the bullet lots to a load port according to the total ALCs may include obtaining the total ALC of each of the available load ports (S301); and dispatching a earliest arriving (ordering by arriving time) bullet lot to an available load port with a minimum total ALC (S302). For example, referring to Table 4, the minimum total ALC of the load lot A4 is 2, thus the bullet lots may be run by the load port A4 may be LOT1 and LOT 2. Further, the bullet lot LOT1 may arrive at the process site 202 earlier than the bullet lot LOT2. Therefore, the bullet lot LOT 4 may be dispatched to the load port A4. Then, the bullet lot LOT1 and the load port A4 may be deleted from Table 4.

The process for dispatching each of the bullet lots to a load port may also include judging if all available load ports has been dispatched with bullet lots (S303). If not all available load ports has been dispatched with bullet lots, S302 may be repeated until all load ports are dispatched with bullet lots. That is, the earliest arriving bullet lot may be dispatched to an available load port with a minimum total ALC, and the process may be repeated until all load ports are dispatched with bullet lots.

For example, referring to Table 4, the bullet lot LOT3 may be dispatched to the load port A1; the bullet lot LOT2 may be dispatched to the load port A3; the bullet lot LOT5 may be dispatched to the load port B2; the bullet lot LOT4 may be dispatched to the load port B1; the bullet lot LOT7 may be dispatched to the load port A2, and the bullet lot LOT6 may be dispatched to the load port B3. Thus, all the available load ports are occupied.

Further, the process for dispatching each of the bullet lots to a load port may include judging if all bullet lots are dispatched to load ports (S304). If all the bullets lots are dispatched to load ports, the dispatch process may be ended. If not all the bullets lot are dispatched to load ports, it may need to notify a personnel who is online to reserve load ports for non-dispatched bullet lots (S305). For example, referring to Table 4, a load port may need to be reserved for the bullet lot LOT8.

Because the total ALC of each of the load ports may be obtained by comparing the bullet lot arriving time intervals of the process site 202 and the port next available time intervals of the load ports, the usage of the station resource is considered. Thus, the station resource may be reasonably managed, and it may ensure the bullet lots to be timely run. Therefore, the efficiency of the manufacturing capacity of a FAB may be ensured by shortening waiting time of the bullet lots.

Further, the semiconductor bullet lot dispatch system may also include a sorting and displaying module (not shown in FIG. 2). The sorting and displaying module may be used to sort and display bullet lots after the bullet lot scenario engine module 206 dispatches each of the bullet lots to a load port according to the total ALCs.

After the bullet lot scenario engine module 206 dispatches each of the bullet lot to a load port according to the total ALCs, the sorting and display module may sort and display each of the bullet lots; and queue up non-dispatched bullet lots to the front of a queue to remind the online planner to reserve available stations or load ports.

As shown in Table 5, the bullet lot LOT8 without being dispatched to a load port may be queued up to the front of the queue, and may be run with a priority. The rest of the bullet lots dispatched with load ports may be run sequentially.

TABLE 5

| Queue | Bullet lot | Pre-reserve information |
|---|---|---|
| 1 | LOT8 | Pre-reserve port |
| 2 | LOT1 | Dispatched port |
| 3 | LOT2 | Dispatched port |
| 4 | LOT3 | Dispatched port |
| 5 | LOT4 | Dispatched port |
| 6 | LOT5 | Dispatched port |
| 7 | LOT6 | Dispatched port |
| 8 | LOT7 | Dispatched port |

Using the dispatch system, planers or supervisors may real time set up and maintain information of the bullet lots, the real-time and accuracy of bullet lot data may be assured. Thus, the semiconductor bullet lot dispatch system may be referred as a real time dispatch (RTD) system.

The RTD system may obtain the bullet lot arriving time intervals according to the work flow information of the bullet lots and the port next available time intervals according to the running information of each of the stations of the processing site. The RTD system may also obtain available load ports when the bullet lots arrive according the usage of the station capacity, and calculate the total ALCs of the available load lots.

Further, the RTD system may dispatch each of the bullet lots to the load ports. Therefore, the waiting time of the bullet lots may be reduced, and the station capacity of the FAB may be reasonably arranged. Further, the RTD system may have the sorting and displaying module. The sorting and displaying module may sort and display the bullet lots, the online operator may real time and directly obtain process information of the bullet lots, thus the complexity of a manufacturing process may significantly reduced.

Figure 4:
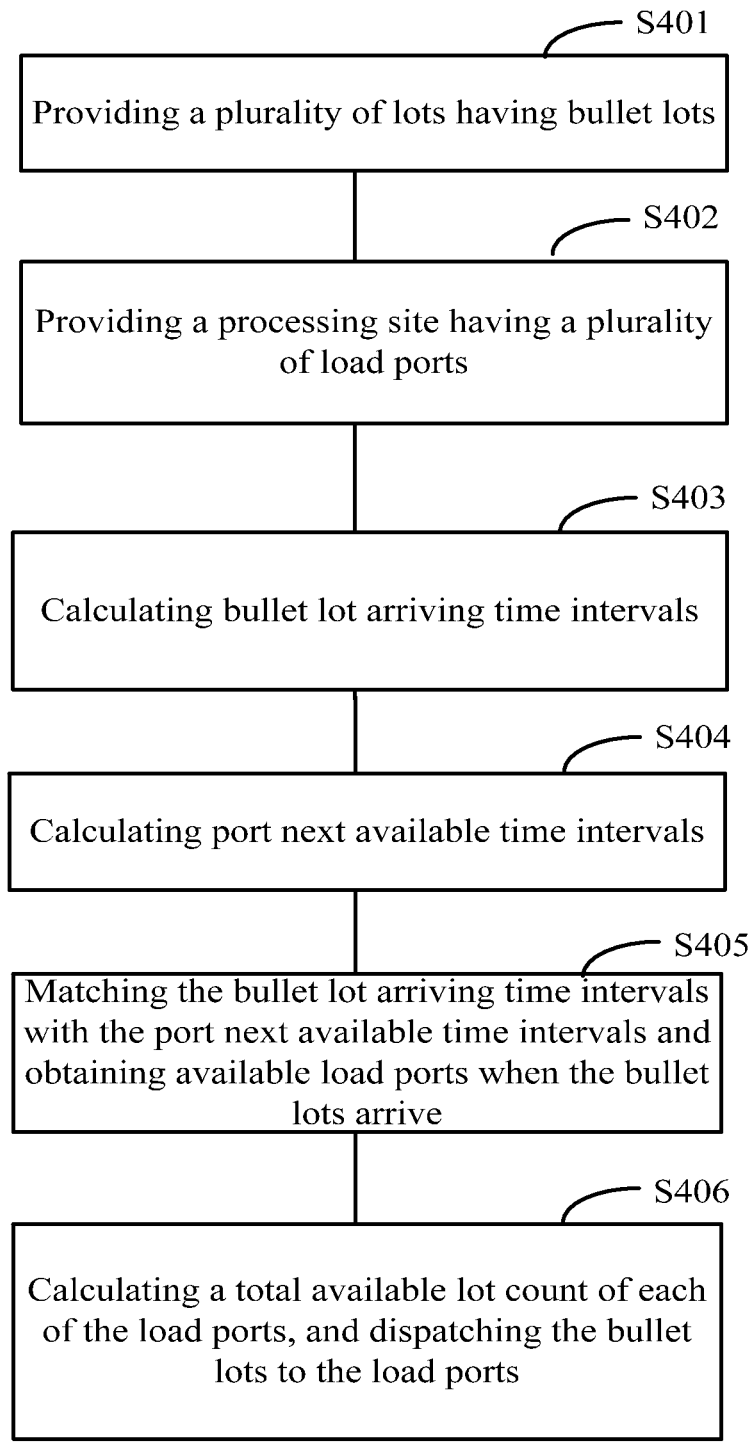
FIG. 4 illustrates a semiconductor bullet lot dispatch method consistent with the disclosed embodiments.

Thus, a semiconductor bullet lot dispatch method is provided by the RTD system. A flow chart of the real time semiconductor bullet lot dispatch method is illustrated in FIG. 4. As shown in FIG. 4, the semiconductor bullet lot dispatch method may include providing a plurality of lots including bullet lots and non-bullet lots (S401), and providing a plurality of processing site having a plurality of load ports suitable for running the bullet lots (S402).

The semiconductor bullet lot dispatch method may also include obtaining work flow information of the bullet lots and calculating the bullet lot arriving time intervals of the bullet lots according to the work flow information (S403). In one embodiment, maintaining and setting up the work follow information of the bullet lots may be performed before obtaining the bullet lot arriving time intervals.

Further, the semiconductor bullet lot dispatch method may include obtaining port next available time intervals according to running information of the load ports (S404). A process for obtaining the port next available time intervals may include obtaining information of currently run lots according to real time information of the load ports; and obtaining the port next available time intervals according to information of the lots and the work flow information of the lots.

Further, the semiconductor bullet lot dispatch method may also include matching the bullet lots with the load ports according to the work flow information and obtaining available load ports when the bullet lots arrive at a process site (S405).

Further, the semiconductor bullet lot dispatch method may also include calculating the total available lot count (ALC) of each of the available load ports according to the bullet lot arriving time intervals and the port next available time intervals, and dispatching the bullet lots to the lord ports according to the total ALCs (S406).

In one embodiment, the bullet arriving time intervals may be compared with the port next available time intervals. When the bullet lot arriving time intervals are smaller than, or equal to the port next available time intervals, the total ALCs of the available stations may add 1; when the bullet lot arriving time intervals are greater than the port next available time intervals, the total ALC of the available stations may add 0.

In one embodiment, referring to FIG. 3, a process for dispatching each of the bullet lots to a load port according to the total ALC may include obtaining the total ALC of each of the load ports (S301); and dispatching a earliest arriving (ordering by arriving time) bullet lot to an available load port with a minimum total ALC (S302). Further, the process for dispatching each of the bullet lots to a load port may include judging if all bullet lots are dispatched to load ports (S304). If all the bullets lots are dispatched to load ports, the dispatch process may be ended. If not all the bullets lot are dispatched to load ports, it may need to remind an online planner to reserve load ports for non-dispatched bullet lots (S305). After dispatching the bullet lots to the load ports, the bullet lots may be queued up and displayed.

Figure 5:
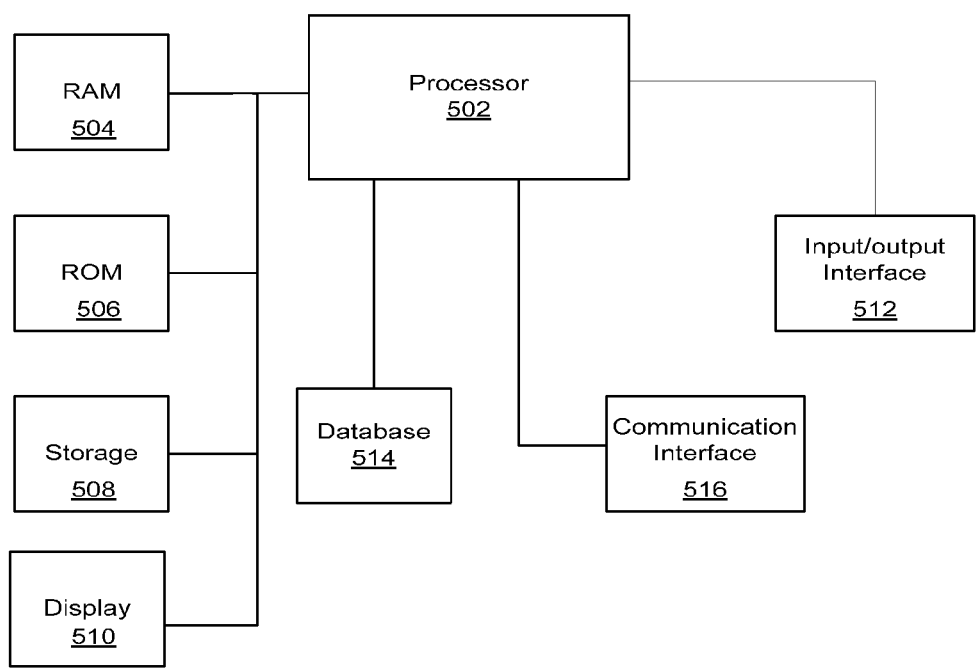
FIG. 5 illustrates an exemplary work station to realize the bullet lot dispatch process consistent with the disclosed embodiments.

The semiconductor bullet lot dispatch method may be implanted into a certain work station (computer) to realize the bullet lot dispatch process. FIG. 5 illustrates an exemplary block diagram of the work station.

The work station may include any appropriately configured computer system. As shown in FIG. 5, the work station may include a processor 502, a random access memory (RAM) unit 504, a read-only memory (ROM) unit 506, a storage unit 508, a display 510, an input/output interface unit 512, a database 514; and a communication interface 516. Other components may be added and certain devices may be removed.

The processor 502 may include any appropriate type of general purpose microprocessor, digital signal processor or microcontroller, and application specific integrated circuit (ASIC). The processor 502 may execute sequences of computer program to perform various processes associated with the semiconductor bullet lot dispatch system, such as setting up the information of the lots 201; obtaining the bullet lot information; obtaining the bullet lot arriving time intervals; obtaining the port next available time intervals; and sorting and displaying bullet lot information, etc. The information of the lots 201 and the load ports may be loaded into RAM 504 for execution by processor 502 from read-only memory 506, or from storage 508.

The storage 508 may include any appropriate type of mass storage provided to store any type of information that processor 502 may need to perform the processes. For example, storage 108 may include one or more hard disk devices, optical disk devices, flash disks, or other storage devices to provide storage space. The storage 508 may be used to store information of the lots 201, the information of the semiconductor dispatch process, and other related information.

The display 510 may provide information to a user or users of the semiconductor bullet lot dispatch system and process, such as the status of the load ports, or a reminding massage for reserving load ports, etc. The display 510 may include any appropriate type of computer display device or electronic device display (e.g., CRT or LCD based devices). The display 510 may be a part of the sorting and displaying module of the semiconductor dispatch system, or an independent component.

The input/output interface 512 may be provided for users to input information into the semiconductor bullet lot dispatch system or for the users to receive information from the semiconductor bullet lot dispatch system. For example, the input/output interface 512 may include any appropriate input device, such as a keyboard, a mouse, an electronic tablet, voice communication devices, or any other optical or wireless input devices, which may be used to input the setting-up information, and modify system information and process parameters, etc. Further, the input/output interface 512 may receive from and/or send information to the bullet lot arriving time initial module 203, the port remain time initial module 204, the future constraint check module 205, the load ports, the bullet lot scenario engine module 206, and/or other devices and modules.

The database 514 may include any type of commercial or customized database, and may also include analysis tools for analyzing the information in the databases. The database 514 may be used for storing information of the bullet lots, process parameters for controlling load ports, and other related information.

The communication interface 516 may provide communication connections such that semiconductor bullet lot dispatch system may be accessed remotely and/or communicate with other systems through computer networks or other communication networks.

In certain other embodiments, the bullet lot arriving time initial module 203, the port remain time initial module 204, the future constraint check module 205, the load ports, and/or the bullet lot scenario engine module 206 may be components or modules of the work station. The bullet lot arriving time initial module 203, the port remain time initial module 204, the future constraint check module 205, the load ports, and the bullet lot scenario engine module 206 may also be separate components which can communicate with the work station.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A semiconductor bullet lot dispatch system, comprising:
   a plurality of semiconductor lots including bullet lots and non-bullet lots;
   a semiconductor processing site including a computer and at least one semiconductor process station configured for processing a semiconductor material and having a plurality of load ports used to load the plurality of semiconductor lots, wherein
   the computer is configured to:
      obtain a work flow information of the plurality of semiconductor lots, and calculate bullet lot arriving time intervals of the bullet lots according to the work flow information and a cycle time information of the bullet lots, wherein the cycle time information is obtained by simulating every process step of each of the plurality of semiconductor lots in a single day;
      calculate port next available time intervals of the plurality of load ports according to a running information of each load ports;
      match the bullet lots with the load ports according to the work flow information, and obtain available load ports for the bullet lots as the bullet lots arrive at the semiconductor processing site, wherein the available load ports are obtained by considering a process requirement of the bullet lots, a performance of the at least one semiconductor process station, and an age of the at least one semiconductor process station; and
      calculate a total available lot count processable at each of the available load ports according to the bullet lot arriving time intervals and the port next available time intervals, and dispatch an earliest arriving bullet lots to a load port having a minimum total available lot count through a dispatch system, the dispatched bullet lots is sorted and displayed and the non-dispatched bullet lots are queued up to the front of a queue, wherein after the computer determines the dispatched bullet lots and the non-dispatched bullet lots:

the at least one semiconductor process station in the semiconductor processing site loads each non-dispatched bullet lot to a pre-reserved port that is contained in the plurality of load ports of the semiconductor processing site, and processes with a priority over the dispatched bullet lots, and the at least one semiconductor process station in the semiconductor processing site loads each dispatched bullet lot to a dispatched port that is contained in the plurality of load ports of the semiconductor processing site, and processes sequentially.

2. The semiconductor bullet lot dispatch system according to claim 1, wherein the computer is further configured to:
sort and display lots on a display device.

3. The semiconductor bullet lot dispatch system according to claim 1, wherein the computer is further configured to:
set-up and maintain the lots.

4. The semiconductor bullet lot dispatch system according to claim 1, wherein the computer is further configured to:
compare all of the bullet lot arriving time intervals with the port next available time interval of a certain available load port;
add 1 to the total available lot count of the available load port when a certain bullet lot arriving time interval is smaller than or equal to the port next available time interval of the available load port; and
add 0 to the total available lot count of the available load port when the bullet lot arriving time is greater than the port next available time interval of the available load port.

5. The semiconductor bullet lot dispatch system according to claim 1, wherein the computer is further configured to:
after dispatching the earliest arriving bullet lot to the load port with the minimum total available lot count, delete the dispatched bullet lot and the correspondingly used load port;
judge whether all bullet lots have been dispatched to the load ports; and
end the dispatching process when the all bullet lots have been dispatched to the load port.

6. The semiconductor bullet lot dispatch system according to claim 1, wherein the computer is further configured to:
obtain information of currently run lots according to the real time information of load ports; and
obtain the port next available time intervals according to the information of the currently run lots and the work flow information of the lots.

7. A semiconductor bullet lot dispatch method, comprising:
providing a plurality of semiconductor lots of a semiconductor material, including bullet lots and non-bullet lots;
providing a computer;
using a semiconductor processing site including at least one semiconductor process station configured for processing a semiconductor material and having a plurality of load ports to load the plurality of semiconductor lots;
collecting, by the computer, a work flow information of the plurality of semiconductor lots and calculating, by the computer, bullet lot arriving time intervals of the bullet lots according to the work flow information and a cycle time information of the bullet lots, wherein the cycle time information is obtained by simulating every process step of each of the plurality of semiconductor lots in a single day;
calculating, by the computer, port next available time intervals of the plurality of load ports according to running information of the load ports;
matching, by the computer, the bullet lots with the load ports according to the work flow information and obtaining, by the computer, available load ports for the bullet lots as the bullet lots arrive at the processing site, wherein the available load ports is obtained by considering a process requirement of the bullet lots, a performance of the at least one semiconductor process station, and an age of the at least one semiconductor process station;
calculating, by the computer, a total available lot count processable at each of the available load ports according to the bullet lot arriving time intervals and the port next available intervals and dispatching, by the computer, an earliest arriving bullet lot to a load port having a minimum total available lot count through a dispatch system, the dispatched bullet lots is sorted and displayed and the non-dispatched bullet lots are queued up to the front of a queue;
after the computer determines the dispatched bullet lots and the non-dispatched bullet lots, loading, by the at least one semiconductor process station in the semiconductor processing site, each non-dispatched bullet lot to a pre-reserved port that is contained in the plurality of load ports of the semiconductor processing site, and processing each non-dispatched bullet lot, by the at least one semiconductor process station in the semiconductor processing site, with a priority over the dispatched bullet lots; and
loading, by the at least one semiconductor process station in the semiconductor processing site, each dispatched bullet lot to a dispatched port that is contained in the plurality of load ports of the semiconductor processing site, and processing each dispatched bullet lot sequentially by the at least one semiconductor process station in the semiconductor processing site.

8. The semiconductor bullet lot dispatch method according to claim 7, after dispatching the bullet lots to the load ports, further including:
sorting, by the computer, and displaying the bullet lots on a display device.

9. The semiconductor bullet lot dispatch method according to claim 7, before obtaining the bullet lot arriving time intervals, further including:
setting up, by the computer, and maintaining bullet lot information in a storage.

10. The semiconductor bullet lot dispatch method according to claim 7, wherein calculating a total available lot count further includes:
comparing, by the computer, all of the bullet lot arriving time intervals with the port next available time interval of a certain available load port;
adding, by the computer, 1 to the total available lot count of the available load port when a certain bullet lot arriving time interval is smaller, or equal to the port next available time interval of the available load port; and
adding, by the computer, 0 to the total available lot count of the available load port when the bullet lot arriving time is greater than the port next available time interval of the available load port.

11. The semiconductor bullet lot dispatch method according to claim 7, wherein dispatching the bullet lots to the load ports further includes:
- after dispatching the earliest arriving bullet lot to the load port with the minimum total available lot count, deleting, by the computer, the dispatched bullet lot and the correspondingly used load port;
- judging, by the computer, whether all bullet lots have been dispatched to the load ports; and
- ending, by the computer, the dispatching process when the all bullet lots have been dispatched to the load port.

12. The semiconductor bullet lot dispatch method according to claim 7, wherein obtaining port next available time intervals further includes:
- obtaining, by the computer, information of currently run lots according to the real time information of load ports; and
- obtaining, by the computer, the port next available time intervals according to the information of the currently run lots and the work flow information of the lots.

13. The semiconductor bullet lot dispatch system according to claim 1, wherein the processing site configured for processing the semiconductor material includes a deposition process, a photolithography process, an etching process, or a measurement process.

14. The semiconductor bullet lot dispatch system according to claim 1, wherein the processing site has a plurality of process stations each having one or more load ports.

15. The semiconductor bullet lot dispatch method according to claim 7, wherein the processing site configured for processing the semiconductor material includes a deposition process, a photolithography process, an etching process, or a measurement process.

16. The semiconductor bullet lot dispatch method according to claim 7, wherein the processing site has a plurality of process stations each having one or more load ports.

17. The semiconductor bullet lot dispatch system according to claim 1, wherein the bullet lots include one of:
- pre-pilot lots before a mass production in the FAB;
- certain lots for solving abnormal process problems of the FAB; and
- certain lots for improving a process level of the FAB.

18. The semiconductor bullet lot dispatch method according to claim 7, wherein the bullet lots include one of:
- pre-pilot lots before a mass production in the FAB;
- certain lots for solving abnormal process problems of the FAB; and
- certain lots for improving a process level of the FAB.

* * * * *